June 30, 1970  L. L. GLEE  3,517,752

PLANTING SHOVEL

Filed Feb. 23, 1968

Lyle L. Glee
INVENTOR.

BY Clarence A. O'Brien
and Harvey B. Jacobson
Attorneys

United States Patent Office 3,517,752
Patented June 30, 1970

3,517,752
PLANTING SHOVEL
Lyle L. Glee, Chester, Mont.
(P.O. Box 113, Galata, Mont. 59444)
Filed Feb. 23, 1968, Ser. No. 707,785
Int. Cl. A01b 39/20, 39/28
U.S. Cl. 172—721
3 Claims

ABSTRACT OF THE DISCLOSURE

A planting shovel for shallow planting including a pair of side wings mounted thereon positionable so as to contact, upwardly lift, and momentarily delay the return of the top layer of dry soil so as to provide for a covering of deposited seed by a lower layer of wet or moisture-containing soil which moves beneath the soil return retarding wings.

---

The instant invention generally relates to seed planting, and is more particularly concerned with a spear point shovel which, through a pair of unique soil-guiding wings thereon, is particularly adapted to provide for a depositing of the seed, in shallow planting, in a furrow, with a covering of the seed being effected through a turning of the lower wet layer immediately thereon while momentarily retarding the redepositing of the top dry layer.

It is a primary object of the instant invention to provide a planting shovel through which, by the particular nature of a pair of soil-guiding wings thereon, advantage can be taken of subsurface moisture normally found in those areas wherein the top or surface layer consists of loose dry dirt. This is achieved by providing for the opening of a seed-receiving furrow in the wet layer immediately below the dry layer with the wet dirt being overlaid directly on the deposited seed while the top loose dry dirt is temporarily retained until the desired seed coverage by the wet layer is achieved. In this manner, seeding can be done at any time without waiting for rain to give the necessary surface moisture, the seed covering lower soil layer providing the desired moisture for proper seed germination.

The planting tool itself includes a pair of rearwardly diverging side plates mounting a replaceable point on the forward end thereof and having a pair of outwardly and upwardly sloping wings affixed thereto rearwardly and above the point, it being contemplated that the point will travel at a depth of four inches or less for effecting a turning of the wet layer immediately below the loose top layer which is engaged and controlled by the wings.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
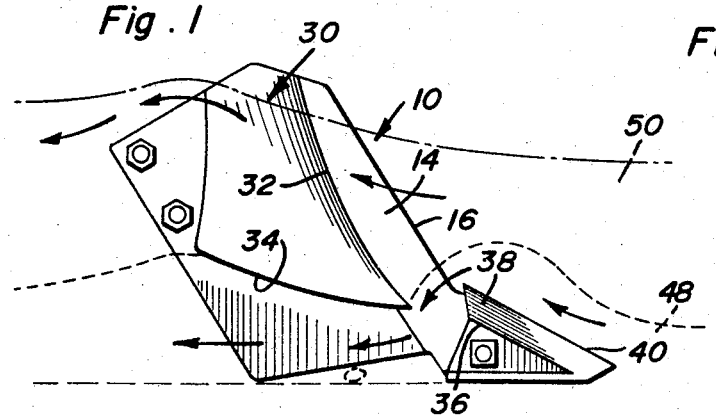
FIG. 1 is a side elevational view of the shovel of the instant invention with the soil flow being schematically illustrated.

Referring now more specifically to the drawings, reference numeral 10 is used to generally designate the spear point shovel comprising the instant invention. This shovel 10 includes a pair of laterally spaced side plates 12 which include forwardly converging portions 14 terminating in a forward upward and rearwardly inclined generally rounded edge or edge portion 16. The side plates 12, rearward of the forward converging portions 14, generally parallel each other and have a pair of mounting bolts 18 extending transversely therebetween toward the rear edges of the plates 12.

Figure 2:
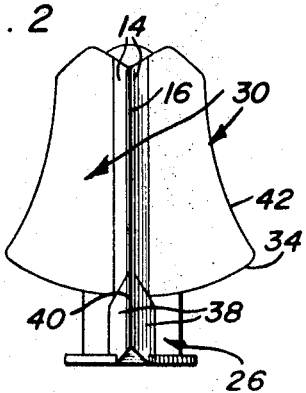
FIG. 2 is a front elevational view of the shovel.
Figure 3:
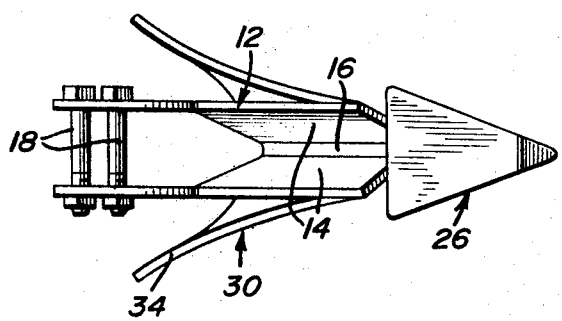
FIG. 3 is a bottom plan view of the shovel.

The converging portions 14 continue below the lower edges of the parallel portions of the plates 12 and integrally form a forwardly extending generally horizontal solid mounting foot 20. The mounting foot 20 includes a flat bottom surface 22 and an upwardly inclined peaked edge 24 for the reception of a replaceable similarly configured point 26 which is releasably bolted thereto by suitable bolt means 28. As will be appreciated from FIGS. 1 and 2, the mounted point 26 forms a forwardly extending slightly enlarged continuation of the converging plate portions 14 and earth splitting rounded edge 16 defined thereby, the point extending at a substantially lesser angle than that of the edge 16.

A dirt displacing wing 30 is provided on the outer face of each side plate 12 and is so located and configured as to allow for a momentary retention, through an upward flowing movement thereof, of an upper layer of soil while a lower layer of soil is being turned therebeneath by the traveling point 26. Each of the wings includes a slightly arcuate or concave leading edge 32 generally paralleling the edge 16 and being welded to the converging portion 14 of the corresponding plate 12 rearward of the leading edge 16. Each wing 30, from the secured forward edge 32 thereof, sweeps rearwardly, upwardly and outwardly in a gradually curving manner. The lower edge 34 of each wing 30 sweeps rearwardly at an angle generally corresponding to that of the point 26, meeting, at the forward end thereof, the forward wing edge 32 at a position rearward of the point 26 and in general alignment with the lower edge 36 of the upper side face 38 of the point 26 which converges with a similar face 38 on the opposite side of the point 26 in forming the top soil piercing edge 40. In this manner, soil split or pierced by the point 26 will ride upwardly and rearwardly over the converging faces 38 and drop drown rearwardly thereof, falling for the most part beneath the leading edges of the wings 30.

Figure 4:
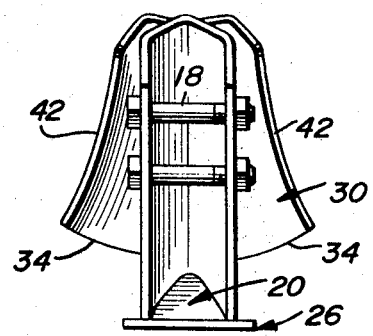
FIG. 4 is a rear elevational view of the shovel.
Figure 5:
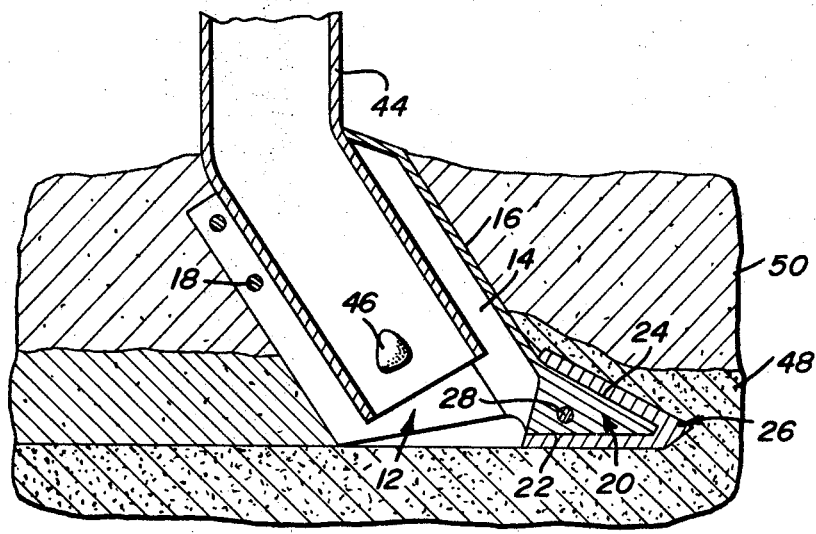
FIG. 5 is an enlarged vertical cross-sectional view of the shovel in soil-engaging position.

With reference to FIG. 4 in particular, it will be noted that the wings 30 also smoothly curve inwardly and upwardly from the lower edges 34 so as to provide for a smooth lift of the soil engaged therewith, with the lifted soil, through the relieved or slightly concave rear edges 42 of the wings 30, being primarily redeposited in the furrow so as to effect a top covering for the turned lower moisture-bearing layer which directly covers the seed. Thus, rather than merely providing for a lateral displacement of the top layer, possibly disrupting or disturbing adjacent furrows, the wings of the instant invention guide and redeposit a substantial portion of the top dry layer and, as a secondary function, provide small protective ridges immediately to each side of the furrow with that portion of the top layer of the soil not deposited within the furrow through the relieved rear edges 42 of the wings 30.

In use, the shovel 10 will be mounted on a planting shank 44 through which the seed 46 will be introduced for deposit within the furrow immediately rearward of the point 26 which is traveling through the wet layer 48 below the top dry layer 50. The soil in the wet layer 48 is, through the inclined faces 38 and piercing edge 40 of the point 26, raised and deposited rearwardly of the point 26 within the furrow formed by the shovel 10 and in overlying relation to the deposited seed 46, the wet soil passing below the forward lower portion of the point following wings 30. The wings 30 in turn engage and, through the arcuate soil lifting configuration thereof, raise that portion of the soil above the point 26 upwardly in a manner which acts so as to retain the top layer until the rear inwardly arcing edges 42 of the wings 30 are reached, at which time the top layer of soil is redeposited, primarily within the furrow and in overlying relation to the previously turned lower layer of wet soil. As such, planting without an initial surface watering, whether artificially or naturally, can be effected with sufficient moisture being provided through the lower moisture bearing layer so as to ensure proper seed germination.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A planting shovel for depositing seed in a furrow beneath a turned lower layer of wet soil and an overlying layer of dry soil, said shovel comprising a pair of laterally spaced side plates, said plates having the forward portions thereof converging and defining a common upwardly and rearwardly inclined dry soil splitting forward edge, a soil piercing point rigid with the forward lower portion of the side plates and projecting forwardly from the common forward edge at a lesser angle to the horizontal than said common edge, said point including upper converging wet soil guiding surfaces defining a piercing edge aligned with said forward edge, and a soil guiding wing mounted on the lateral outer face of each side plate, each wing including a forward edge fixed to the corresponding plate generally parallel to and rearward of the common forward plate edge, each wing sweeping rearwardly and outwardly from the fixed forward edge thereof so as to effect a raising and relative rearward movement of encountered dry soil, each wing including a lower edge extending to the lower end of the forward wing edge and defining a corner point in general alignment with and in rearwardly spaced relation to the upper soil guiding surfaces on the piercing point so as to allow for a redepositing of wet soil guided upwardly by said soil guiding surfaces forward of the wings, each wing also including a generally vertical rear edge slightly arcuately relieved along the length thereof for enabling a redepositing of raised dry soil generally rearward of and in alignment with the forward edge of the wing.

2. The shovel of claim 1 wherein each wing sweeps inwardly and upwardly from the lower edge thereof for facilitating the raising of the dry soil, and each wing lower edge extends upwardly and outwardly from the lower end of the wing forward edge and defines an arcuate angle therewith.

3. The shovel of claim 2 wherein the forward portions of the side plates include a mounting foot thereon, said piercing point being removably mounted on said foot.

References Cited
UNITED STATES PATENTS

| | | | |
|---|---|---|---|
| 627,620 | 6/1899 | Marsh | 172—722 X |
| 756,849 | 4/1904 | Gwynes | 172—724 X |
| 1,102,703 | 7/1914 | Underwood | 172—722 |
| 2,768,591 | 10/1956 | James | 172—724 X |
| 2,779,263 | 1/1957 | Franz et al. | 111—85 |
| 3,251,325 | 5/1966 | Hyland et al. | 111—86 |

ROBERT E. PULFREY, Primary Examiner

W. J. CONLON, Assistant Examiner

U.S. Cl. X.R.

111—85, 86; 172—722, 722 X, 724 X